(12) United States Patent
Kim

(10) Patent No.: US 8,465,823 B1
(45) Date of Patent: Jun. 18, 2013

(54) OPTICAL MEDIA HAVING TRANSPARENT BACK SIDE COATING

(75) Inventor: Eui Kyoon Kim, Woburn, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/334,179

(22) Filed: Dec. 22, 2011

(51) Int. Cl.
*G11B 7/00* (2006.01)

(52) U.S. Cl.
USPC .................. 428/64.1; 428/64.4; 369/275.3

(58) Field of Classification Search
USPC ............................ 369/275.3, 275.5
See application file for complete search history.

(56) References Cited

U.S. PATENT DOCUMENTS

| | | | |
|---|---|---|---|
| 5,480,596 A | 1/1996 | Okubo et al. | |
| 7,369,483 B2 * | 5/2008 | Slafer et al. | 369/275.4 |
| 8,014,246 B2 | 9/2011 | Mahnad | |
| 2007/0222096 A1 | 9/2007 | Slafer | |
| 2011/0141868 A1 | 6/2011 | Mahnad | |
| 2011/0241239 A1 | 10/2011 | Mahnad | |

FOREIGN PATENT DOCUMENTS

| | | |
|---|---|---|
| EP | 0408283 A2 | 1/1991 |
| EP | 0545371 A1 | 6/1993 |
| JP | 02218031 A | 8/1990 |
| JP | 05266516 A | 10/1993 |
| WO | 2005072936 A1 | 8/2005 |

OTHER PUBLICATIONS

Wikipedia, the free encyclopedia, Transparent conducting film, http://wikipedia.org/wiki/Transparent_conduction_film, Oct. 5, 2011.
Jingyu Zou, et al., Metal grid/conducting polymer hybrid transparent electrode for inverted polymer solar cells, Applied Physics Letters 96, 203301, American Institute of Physics 2010.
European Patent Office, The International Search Report and the Written Opinion of the International Searching Authority for corresponding International Application No. PCT/US2012/070532 mailed Feb. 14, 2013.

* cited by examiner

Primary Examiner — Elizabeth Mulvaney
(74) Attorney, Agent, or Firm — Brooks Kushman P.C.

(57) ABSTRACT

An optical media such as an optical tape includes a substrate, a pre-format layer on one side of the substrate, and a back side coating. The back side coating is optically transparent and is electrically conductive. One of the substrate and the pre-format layer is between the back side coating and the other one of the substrate and the pre-format layer.

6 Claims, 3 Drawing Sheets

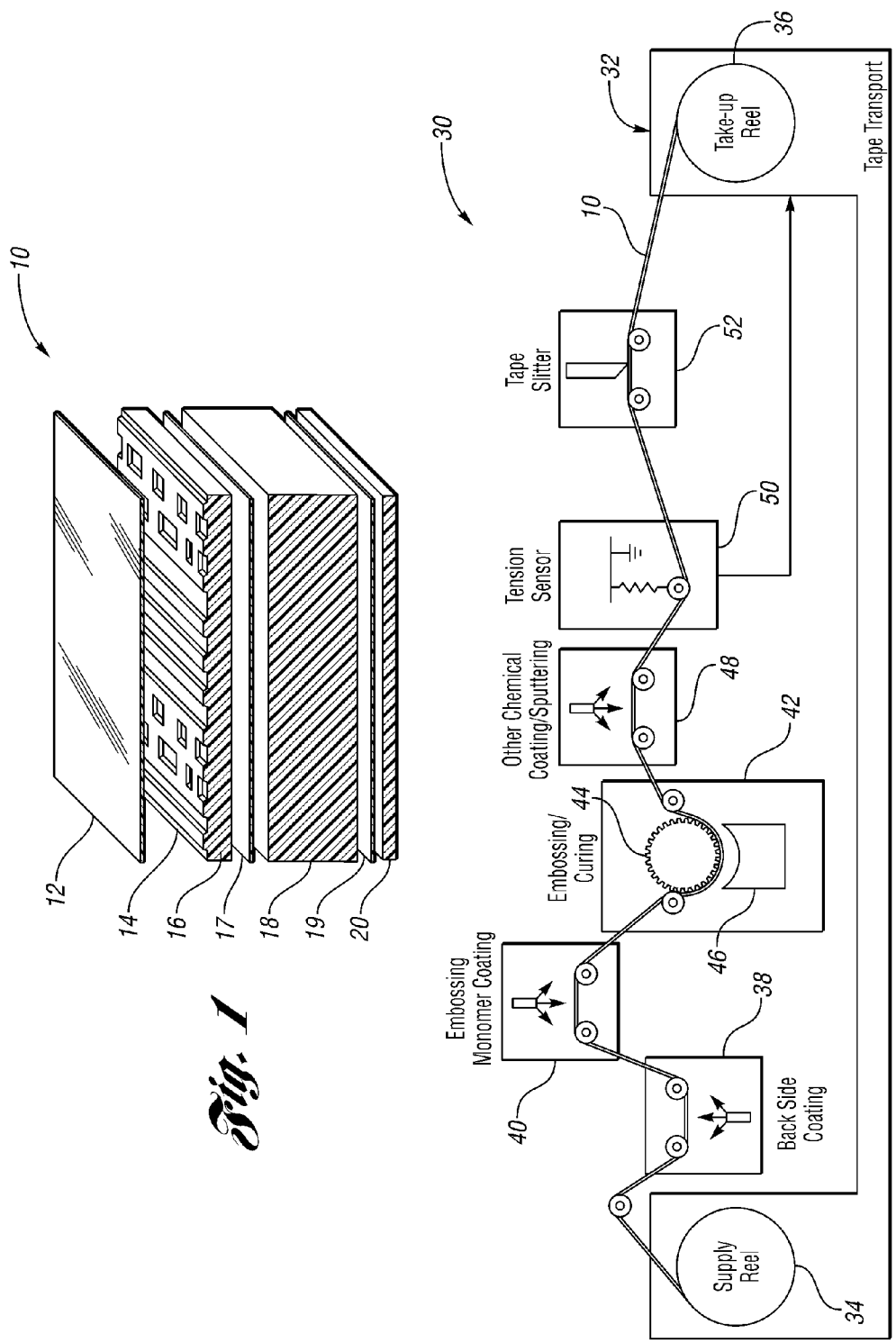

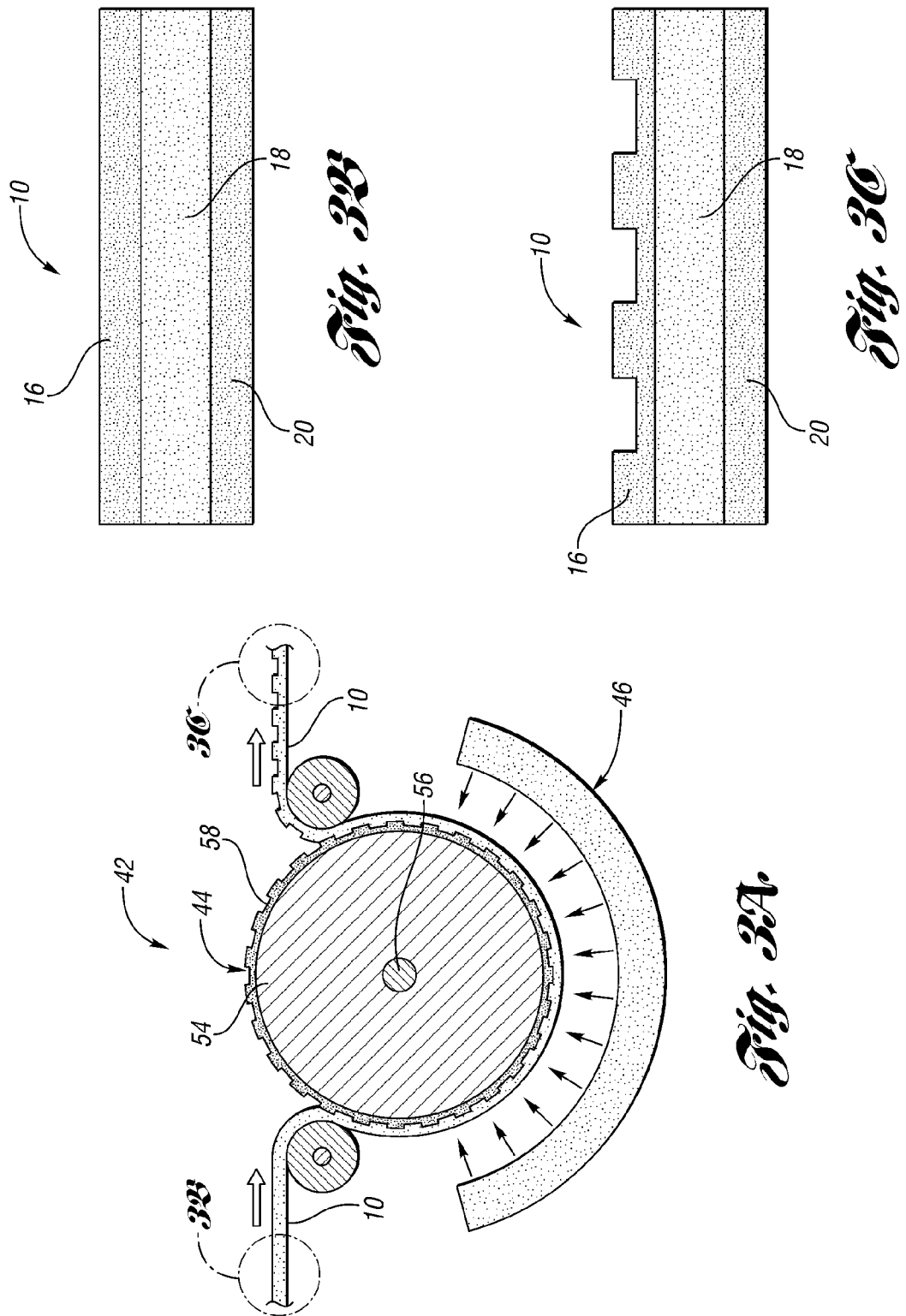

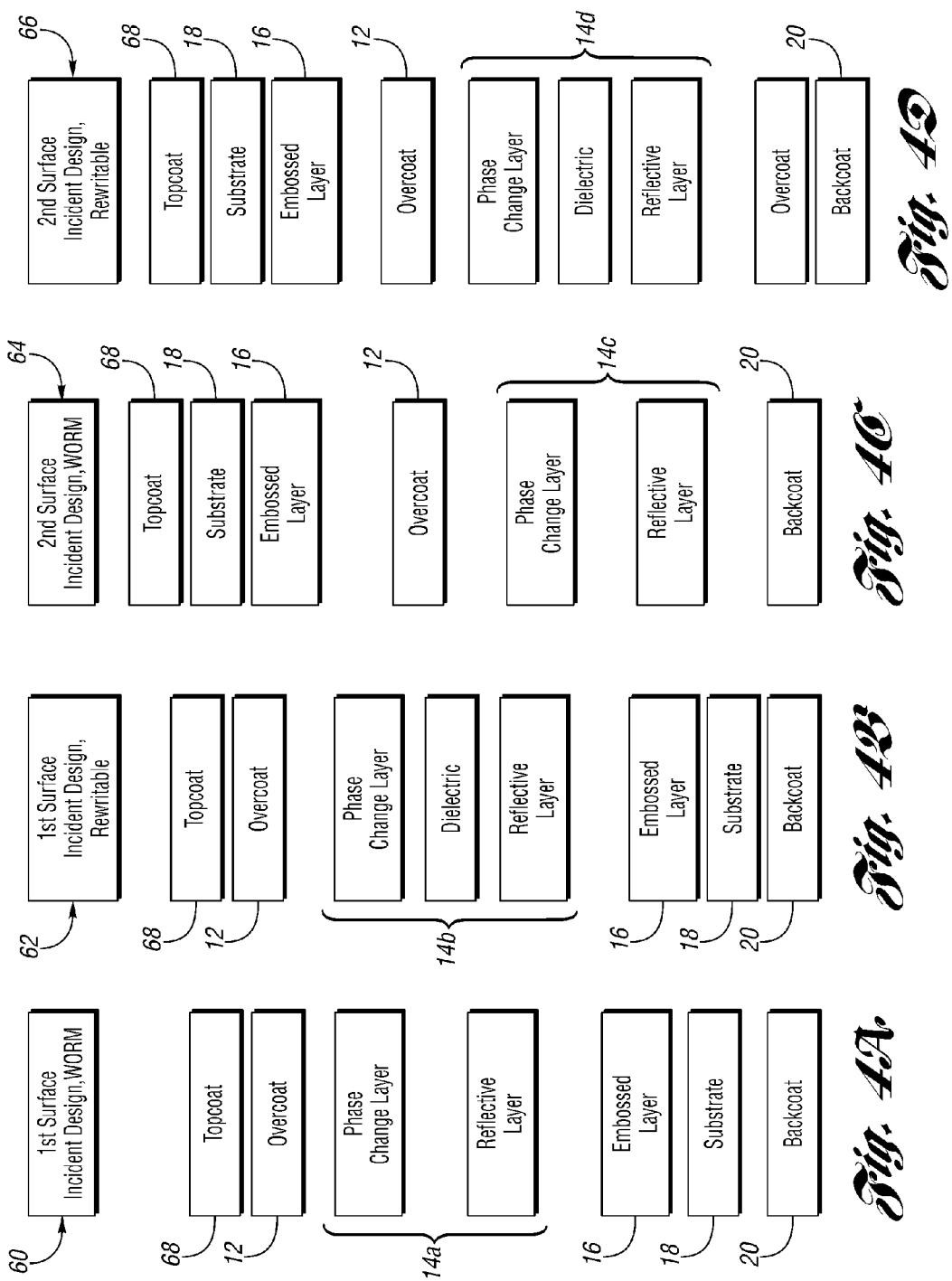

OPTICAL MEDIA HAVING TRANSPARENT BACK SIDE COATING

TECHNICAL FIELD

The present invention relates to back side coatings for optical tape and to a method and system for producing optical tape having a back side coating.

BACKGROUND

Optical tape is a media for data storage. Optical tape may include a thin back side coating to improve winding properties and to prevent static charge. Typical back side coatings are formed from materials that are (i) electrically conductive and (ii) strongly ultraviolet (UV) radiation absorbing or reflective.

Roll-to-roll nano-imprint lithography systems are used for patterning or pre-formatting optical tape with the imprint of nano-structure features such as land and groove and wobble patterns. The pre-formatting operation includes curing photo-polymerizable materials of the optical tape with UV radiation. As a result, back side coatings that are either UV radiation absorbing or reflective may induce relatively large decrease in the roll-to-roll process throughput.

SUMMARY

Embodiments of the present invention are directed to an optical media such as an optical tape having a back side coating that is optically transparent and electrically conductive. Back side coatings in accordance with embodiments of the present invention are optically transparent at least in the ultraviolet (UV) radiation range and therefore differ from typical back side coatings that are UV radiation absorbing or reflective. As back side coatings in accordance with embodiments of the present invention are UV transparent and electrically conductive, the desired winding properties and static charge removal characteristics can be achieved without sacrificing roll-to-roll imprint process throughput.

A back side coating for an optical media such as an optical tape in accordance with embodiments of the present invention may be formed from optically transparent and electrically conductive oxides including indium tin oxide (ITO), fluoride doped tin oxide (FTO), and doped zinc oxide. Alternatively or additionally, a back side coating for an optical media such as an optical tape in accordance with embodiments of the present invention may be formed from optically transparent and electrically conductive materials including conductive polymers, films with carbon nanotubes, graphene, and metal grid structures, and other organic films and other metal grid films. Such oxides and materials may be used for a back side coating of an optical tape in accordance with embodiments of the present invention in order for the back side coating to obtain the properties of being UV transparent and electrically conductive.

An object of the present invention includes an optical media such as an optical tape having a back side coating that is transparent at least in the UV radiation range and is electrically conductive.

Another object of the present invention includes a method and a system for producing an optical media such as an optical tape having a back side coating that is transparent at least in the UV radiation range and is electrically conductive.

In carrying out one or more of the above objects and other objects, an embodiment of the present invention provides an optical media having a substrate, a pre-format layer on one side of the substrate, and a back side coating. The back side coating is optically transparent and is electrically conductive. One of the substrate and the pre-format layer is between the back side coating and the other one of the substrate and the pre-format layer.

In an embodiment, the back coat coating is optically transparent at least in the ultraviolet range. The back coat coating may include an optically transparent and electrically conductive oxide such as indium tin oxide (ITO), fluoride doped tin oxide (FTO), and doped zinc oxide. The back side coating may include at least one of electrically conductive polymers, films with carbon nanotubes, graphene, and metal grid structures. In an embodiment, the back side coating is on an opposite side of the substrate and a recording layer may be on the pre-format layer. In another embodiment, the back side coating is positioned apart from the pre-format layer on the same side of the substrate. In this embodiment, a recording layer may be on the back side coating and between the back side coating and the pre-format layer.

Further, in carrying out one or more of the above objects and other objects, an embodiment of the present invention provides a method for generating an optical media such as an optical tape. The method includes depositing a back side coating that is optically transparent and electrically conductive on one side of a substrate. The method further includes depositing a polymer layer on an opposite side of the substrate. The method further includes embossing the polymer layer with embossments using a drum having protrusions and hardening the embossed surface of the polymer layer prior to removing the polymer layer from the drum.

Also, in carrying out one or more of the above objects and other objects, the present invention provides a system for generating an optical media such as an optical tape. The system includes a back side coating stage, an embossing monomer coating stage, an embossing assembly, and a curing assembly. The back side coating stage is configured to deposit a back side coating that is optically transparent and electrically conductive on one side of a substrate. The embossing monomer coating stage is configured to deposit a polymer layer on an opposite side of the substrate. The embossing assembly has a drum with protrusions configured to emboss the polymer layer with embossments. The curing assembly has an illumination source configured to illuminate the embossed surface of the polymer layer with ultraviolet radiation prior to removal of the polymer layer from the drum.

BRIEF DESCRIPTION OF THE DRAWINGS

FIG. 1 illustrates a sectional view of an optical tape in accordance with an embodiment of the present invention;

FIG. 2 illustrates a block diagram of an optical tape generation system for producing the optical tape;

FIG. 3A illustrates a side elevation view of the embossing/curing stage of the roll-to-roll system in which the embossing/curing stage embosses or pre-formats information-bearing structures in the optical tape;

FIG. 3B illustrates a cross-sectional view of the optical tape just prior to entering the embossing/curing stage of the roll-to-roll system;

FIG. 3C illustrates a cross-sectional view of the optical tape just after exiting from the embossing/curing stage of the roll-to-roll system;

FIG. 4A illustrates a sectional block diagram view of an optical tape having a first surface incident (air-incident) WORM media layer composition in accordance with an embodiment of the present invention;

FIG. 4B illustrates a sectional block diagram of an optical tape having a first surface incident (air-incident) rewritable media layer composition in accordance with an embodiment of the present invention;

FIG. 4C illustrates a sectional block diagram of an optical tape having a second incident (substrate-incident) WORM media layer composition in accordance with an embodiment of the present invention; and FIG. 4D illustrates a sectional block diagram of an optical tape having a second incident (substrate-incident) rewritable media layer composition in accordance with an embodiment of the present invention.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a sectional view of an optical tape 10 in accordance with an embodiment of the present invention is shown. Optical tape 10 includes a plurality of layers or films stacked on top of one another. The layers include an overcoat 12, a recording layer 14, a polymer layer 16, a substrate (i.e., carrier layer or base film) 18, and a back side coating 20.

Overcoat 12 protects the remaining lower layers of optical tape 10 from physical damage. Overcoat 12 may include anti-reflective properties (e.g., low index of refraction) to prevent unwanted reflections of laser light from an optical head from the layers within optical tape 10 and to allow the laser light to penetrate through overcoat 12 more efficiently. Overcoat 12 may be applied by sputtering.

Recording layer 14 enables reading or writing of user data from or to optical tape 10. Recording layer 14 belongs to a class of materials that change one or more physical properties in response to exposure to laser or other radiation emitted from an optical head. The materials include phase change and dye-polymer media. For instance, recording layer 14 includes a plurality of layers or films including a dielectric layer followed by a phase change layer followed by another dielectric layer followed by a reflective layer. The phase change layer is sensitive to laser light radiation whereby the phase change layer changes from an amorphous to a crystalline phase when subjected to sufficient heat of the laser light. Once changed, the composition of the material prevents it from changing back to the amorphous state. The reflective layer is made of a metal material such as silver, aluminum, or antimony and reflects laser light that passes through the phase change layer. The reflective layer further attenuates light from above, and reflects light from below, thus attenuating and blocking light from above and below from passing through and mixing with laser light, which may introduce noise in the nominal reflected laser light.

Polymer layer 16 is to be embossed or pre-formatted with information bearing-structures such as pit, land, groove, wobble patterns, or the like. Such structures are physical features that are incorporated into the surface of polymer layer 16. Position and tracking, error correction, focusing, and other information can be provided or enhanced by the surface features as these features are readable by an optical head. The surface features are incorporated into optical tape 10 at the time of manufacture and this process is generally referred to as physical pre-formatting. As described in greater detail below, polymer layer 16 may be formed from a monomer fluid by a drum embossing and ultraviolet (UV) curing apparatus where polymer layer 16 is embossed with the information bearing-structures (for example, land and groove features) and cured at the same time. While curing, polymer layer 16 converts from a liquid monomer to a solid polymer and may be permanently attached to substrate 18. Polymer layer 16 is attached to substrate 18 by a tie coat/adhesion promoter 17.

Substrate 18 is positioned underneath polymer layer 16 and provides mechanical support. Substrate 18 may be created from a high-performance thermoplastic polyester film such as polyethylene naphthalate (PEN), polyethylene terephthalate (PET), or similar material having appropriate mechanical, thermal, and hydroscopic properties for a data storage optical media product.

Back side coating 20 is attached to the back side of substrate 18 opposite polymer layer 16. Back side coating 20 is attached to substrate 18 by a second tie coat/adhesion promoter 19. Back side coating 20 is electrically conductive and thereby minimizes the buildup of static charge. Back side coating 20 may have a textured surface acting as a conduit to release any entrapped air generated during tape subsystem operation. Back side coating 20 may include single or multiple layers for providing friction and/or surface control, thermal conductivity, and dissipation of static electricity.

In addition, as indicated above, back side coating 20 is optically transparent at least in the ultraviolet (UV) radiation range. Back side coating 20 is formed from optically transparent and electrically conductive materials such as, for instance, indium tin oxide (ITO), fluoride doped tin oxide (FTO), and doped zinc oxide, conductive polymers, organic films with carbon nanotubes, graphene, and metal grid structures. In sum, back side coating 20 is UV transparent and electrically conductive.

Referring now to FIG. 2, a block diagram of an optical tape generation system 30 for producing optical tape 10 in accordance with an embodiment of the present invention is shown. System 30 includes a roll-to-roll nano-imprint lithography process (stages 40 and 42 in FIG. 2) for generating pre-formatted optical tape such as optical tape 10. System 30 includes a plurality of stages and a tape transport mechanism 32 for moving optical tape 10 through the different stages. Tape transport mechanism 32 includes a supply reel 34 and a take-up reel 36. The stages of system 30 are between reels 34 and 36. Supply reel 34 unwinds and dispenses optical tape 10 in its initial form. In the initial form, optical tape 10 just includes substrate 18. Take-up reel 36 winds and wraps optical tape 10 in its final form after optical tape 10 has been processed by the stages of system 30. In its final form, optical tape 10 includes overcoat 12, recording layer 14, polymer layer 16, substrate 18, and back side coating 20.

The stages of system 30 beginning in order from supply reel 34 to take-up reel 36 include a back side coating stage 38, an embossing monomer coating stage 40, an embossing/curing stage 42 having an embossing assembly 44 and a curing assembly 46, another chemical coating/sputtering stage 48, a tension sensor stage 50, and a tape splitter stage 52. Back side coating stage 38 coats back side coating 20 onto the back side of substrate 18 of optical tape 10 as dispensed from supply reel 34 in its initial form. Embossing monomer coating stage 40 coats polymer layer 16 onto the other side of substrate 18 opposite back side coating 20. More particularly, embossing monomer coating stage 40 dispenses a monomer onto the other side of substrate 18 opposite back side coating 20 and this monomer becomes polymer layer 16. At this point, optical tape 10 includes polymer layer 16 in its non-processed form (i.e., the monomer), substrate 18, and back side coating 20 (see FIG. 3B). Optical tape 10 is then introduced into embossing/curing stage 42. Embossing/curing stage 42 imprints (i.e., embosses) polymer layer 16 with the information-bearing structures and cures the embossed polymer layer 16. At this point, optical tape 10 includes polymer layer 16 in its embossed or pre-format form, substrate 18, and back side coating 20 (see FIG. 3C). Next, other coating/sputtering stage 48 coats recording layer 14 onto pre-format polymer layer 16 and then coats overcoat 12 onto recording layer 14. As such, at this point, optical tape 10 includes overcoat 12, recording layer 14, pre-format polymer layer 16, substrate 18, and back side coating 20 (see FIG. 1). Tension sensor stage 50 senses the tension of optical tape 10. Tension sensor stage 50 is in communication with tape transport system 32 to provide information regarding the tension of optical tape 10. Tape slitter stage 52 cuts optical tape 10.

Referring now to FIG. 3A, with continual reference to FIG. 2, a side elevation view of embossing/curing stage 42 of roll-to-roll system 30 is shown. As indicated above, embossing/curing stage 42 embosses or pre-formats information-bearing structures in polymer layer 16 of optical tape 10. Optical tape 10 is introduced to embossing/curing stage 42 from embossing monomer coating stage 40 of roll-to-roll system 30. Optical tape 10 as introduced to embossing/curing stage 42 includes polymer layer 16 in its pure non-embossed form (i.e., as a monomer), substrate 18, and back side coating 20. FIG. 3B illustrates a cross-sectional view of optical tape 10 just prior to entering embossing/curing stage 42.

Embossing assembly 44 includes a drum 54. Drum 54 is mounted for rotation about a rotational axis 56. Drum 54 has an outer circumferential surface 58 having a predetermined pattern of protrusions for embossing pre-formatted pattern of optically readable embossments in the surface of polymer layer 16 as optical tape 10 is rolled over drum 54. Optical tape 10 enters embossing/curing stage 42 such that polymer layer 16 faces drum 54. As optical tape 10 enters embossing/curing stage 42, a backing roll presses optical tape 10 onto drum 54 with polymer layer 16 being in direct pressured engagement with outer surface 58 of drum 54. Optical tape 10 rotates with drum 54 as drum 54 rotates and the protrusions of outer drum surface 58 create the information-bearing structures in polymer layer 16.

While polymer layer 16 is in engaged with outer drum surface 58, curing assembly 46 applies UV radiation or illumination to optical tape 10. Curing assembly 46 is outside of drum 54. As such, the UV radiation is directed towards back-side coating 20, substrate 18, and polymer layer 16 in that order and then towards drum 54. The UV radiation is applied to solidify (i.e., cure) polymer layer 16 with the embossments therein prior to removal of optical tape 10 from drum 54. Separation of optical tape 10, with the now-patterned polymer layer 16, from outer drum surface 58 is facilitated by an up-stream backing roll. Optical tape 10 then exits from embossing/curing stage 42 and proceeds to coating/sputtering stage 48 to receive recording layer 14 and overcoat 12. Optical tape 10 as exited from embossing/curing stage 42 includes pre-format polymer layer 16, substrate 18, and back side coating 20. FIG. 3C illustrates a cross-sectional view of optical tape 10 just after exiting from embossing/curing stage 42.

As described, back side coating 20 is optically transparent at least in the UV radiation range. As such, the base film-stack of optical tape 10 (polymer layer 16, substrate 18, and back side coating 20) within embossing/curing stage 42 is transparent in the UV curing wavelength. Accordingly, curing assembly 46 can be positioned outside of drum 54 to direct UV radiation towards optical tape 10 pressed against drum 54 with polymer layer 16 in direct engagement with outer drum surface 58. As UV radiation is directed from curing assembly 46 towards drum 54, drum 54 is preferably made of a metal such as nickel (Ni).

As described, an optical media in accordance with embodiments of the present invention such as optical tape 10 includes a plurality of layers including back side coating 20 that is optically transparent in at least the UV range and is electrically conductive. Optical tape 10 is read from the "first surface" (laser light radiation incident on the feature-containing surface of the tape). However, optical tape 10 is just one example of pre-formatted optical tape having back side coating 20. The other layers of pre-formatted optical tape in accordance with embodiments of the present invention can be varied in number, composition, thickness, etc., to operate in a write once mode (i.e., cannot be altered after user data is written) or an erasable mode (i.e., a user can erase and re-use the tape). In the case of "second surface" recording (i.e., reading/writing through the substrate before encountering the recording layer), the composition of the layers are adjusted accordingly.

Referring now to FIGS. 4A, 4B, 4C, and 4D, with continual reference to FIG. 1, sectional block diagrams of different optical tapes in accordance with other embodiments are shown. In particular, FIG. 4A illustrates a sectional block diagram view of an optical tape 60 having a first surface incident (air-incident) WORM media layer composition. FIG. 4B illustrates a sectional block diagram of an optical tape 62 having a first surface incident (air-incident) rewritable media layer composition. FIG. 4C illustrates a sectional block diagram of an optical tape 64 having a second incident (substrate-incident) WORM media layer composition. FIG. 4D illustrates a sectional block diagram of an optical tape 66 having a second incident (substrate-incident) rewritable media layer composition.

Each optical tape 60, 62, 64, and 66 includes back side coating 20. Further, each optical tape 60, 62, 64, and 66 generally includes the same layers as optical tape 10. For instance, each optical tape 60, 62, 64, and 66 includes overcoat 12, pre-format or embossed polymer layer 16, and substrate 18. Each optical tape 60, 62, 64, and 66 further respectively includes a recording layer 14a, 14b, 14c, and 14d.

Each optical tape 60, 62, 64, and 66 also includes a topcoat 68. Topcoat 68 is an inorganic or organic, scratch-resistant film applied by a sputter process and provides a protective layer for the other layers of the optical tape. Topcoat 68 may include anti-reflective properties (e.g., low index of refraction) to prevent unwanted reflections of laser light from wires within the optical tape.

As shown in FIGS. 4A, 4B, 4C, and 4D, the arrangement of the optical tape layers differs between optical tapes 60, 62, 64, and 66. Further, each optical tape 60, 62, 64, and 66 has a respective recording layer 14a, 14b, 14c, and 14d having a composition and arrangement of layers different from recording layer 14 of optical tape 10 and generally different from one another. A constant is that each optical tape 60, 62, 64, and 66 has back side coating 20 as described above.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An optical media comprising:
   a substrate;
   a pre-format layer on the substrate on one side of the substrate; and
   a back side coating, wherein the back side coating is optically transparent at least in the ultraviolet range and is electrically conductive;
   wherein the pre-format layer is between the back side coating and the substrate with the back side coating being positioned apart from the pre-format layer on the same side of the substrate.

2. The optical media of claim 1 wherein:
   the back side coating includes an optically transparent and electrically conductive oxide.

3. The optical media of claim 2 wherein:
   the oxide includes at least one of indium tin oxide (ITO), fluoride doped tin oxide (FTO), and doped zinc oxide.

4. The optical media of claim 1 wherein:
   the back side coating includes a metalized film.

5. The optical media of claim 1 further comprising:
   a recording layer, wherein the recording layer is on the back side coating and is between the back side coating and the pre-format layer.

6. The optical media of claim 1 wherein:
   the optical media is an optical tape.

\* \* \* \* \*